(12) United States Patent
Mousavi Hondori et al.

(10) Patent No.: US 11,485,149 B1
(45) Date of Patent: Nov. 1, 2022

(54) SYSTEM AND METHOD FOR THERMAL-VISUAL SERVOING

(71) Applicant: CreateMe Technologies LLC, New York, NY (US)

(72) Inventors: Hossein Mousavi Hondori, Mountain View, CA (US); Victoria Nicole Florence, San Mateo, CA (US); Sriranjani Kalimani, San Francisco, CA (US); Mina Fanaian, San Francisco, CA (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/845,668

(22) Filed: Jun. 21, 2022

(51) Int. Cl.
*B41J 11/00* (2006.01)
*G01J 5/02* (2022.01)
*G01J 5/00* (2022.01)

(52) U.S. Cl.
CPC .... *B41J 11/00212* (2021.01); *B41J 11/00222* (2021.01); *B41J 11/00242* (2021.01); *G01J 5/0205* (2013.01); *G01J 2005/0077* (2013.01)

(58) Field of Classification Search
CPC ............ B41J 11/00212; B41J 11/00222; B41J 11/00242; G01J 5/0205; G01J 2005/0077
See application file for complete search history.

(56) References Cited

U.S. PATENT DOCUMENTS

2020/0224906 A1\* 7/2020 Kusukame ............ G01J 5/0025

\* cited by examiner

*Primary Examiner* — Bradley W Thies
(74) *Attorney, Agent, or Firm* — Yao Legal Services, Inc.; Shun Yao

(57) ABSTRACT

One embodiment can provide a heating system with thermal-visual-servo control. The system can include a heat source configured to emit localized heat to an object, a thermal camera configured to capture thermal images of the object, and a motion-control module coupled to the heat source and configured to control movement and focus of the heat source based on temperature information extracted from the thermal images, thereby facilitating controlled heating of the object.

20 Claims, 10 Drawing Sheets

SYSTEM AND METHOD FOR THERMAL-VISUAL SERVOING

RELATED APPLICATION

This application is related to U.S. patent application Ser. No. 17/845,371, entitled "Drying and Curing Systems," filed Jun. 21, 2022, by Christopher Foster, Andrew Xu, and Yaala Belau, and U.S. patent application Ser. No. 17/845,612, entitled "Drying and Curing Heating Systems," filed Jun. 21, 2022, by Randy K. Roushall and Christopher James Foster, the disclosures of which are herein incorporated by reference in its entirety.

BACKGROUND

Field

This disclosure is generally related to automation in garment manufacturing. More specifically, this disclosure is related to a system and method for controlling localized drying of a print area during garment manufacturing.

Related Art

Direct-to-garment (DTG) printing techniques have been widely used in garment manufacturing, and more particularly, in personalization of garments (e.g., by printing personalized designs on garments). DTG uses an inkjet printer to spray aqueous textile inks onto garment pieces. A typical DTG process can include a pretreatment process that allows water-based ink to bond more thoroughly with the garment fabric. Pretreating a garment piece can include applying a pretreatment solution on the garment piece and drying the garment piece subsequent and sometimes prior to printing. This drying process can consume time and energy.

SUMMARY

One embodiment can provide a heating system with thermal-visual-servo control. The system can include a heat source configured to emit localized heat to an object, a thermal camera configured to capture thermal images of the object, and a motion-control module coupled to the heat source and configured to control movement and focus of the heat source based on temperature information extracted from the thermal images, thereby facilitating controlled heating of the object.

In a variation on this embodiment, the heat source can include one or more of: a heat gun, a blow dryer, and a heat lamp. The heat source can be configured to change the size and focus of the heat treatment area.

In a variation on this embodiment, the heat source is coupled to a motion module comprising one or more of: a gantry system, a robotic arm, and a ball-joint unit.

In a variation on this embodiment, the motion-control module can be configured to implement a servo-control technique to control the movement of the heat source.

In a further variation, the servo-control technique can include a reinforcement learning (RL)-based technique or a graph-based motion-planning technique.

In a variation on this embodiment, the heating system can further include a temperature-map-computing module configured to compute a time-varying temperature map to indicate temperature distribution on the object's surface at pixel level based on the thermal images. The temperature-map-computing module can be further configured to calculate a rate of change of the temperature at each pixel and store the calculated rate in computer memory.

In a variation on this embodiment, the heating system can further include a visible-light camera configured to capture visible-light images of the object.

In a further variation, the thermal camera and the visible-light camera are calibrated such that a pixel in a thermal image corresponds to a pixel in a visible-light image.

In a variation on this embodiment, the heating system can further include a depth camera configured to capture depth images of the object.

In a further variation, the depth camera is calibrated such that a pixel in a thermal image and/or a pixel in a visible-light image correspond(s) to a pixel in a depth image.

One embodiment can provide a method for facilitating thermal-visual-servo control while heating an object. The method can include applying localized heat to the object using a movable, directional heat source, capturing thermal images of the object while applying the heat, and controlling movement and focus of the movable, directional heat source based on temperature information extracted from the thermal images, thereby facilitating controlled heating of the object.

One embodiment can provide a garment-drying station. The station can include a working surface for supporting a to-be-dried garment piece, a heat source configured to emit heat to the garment piece, a thermal camera configured to capture thermal images of the garment piece, and a motion-control module coupled to the heat source and configured to control movement and focus of the heat source based on temperature information extracted from the thermal images, thereby facilitating controlled heating of the garment piece.

BRIEF DESCRIPTION OF THE FIGURES

In the figures, like reference numerals refer to the same figure elements.

DETAILED DESCRIPTION

Figure 1:
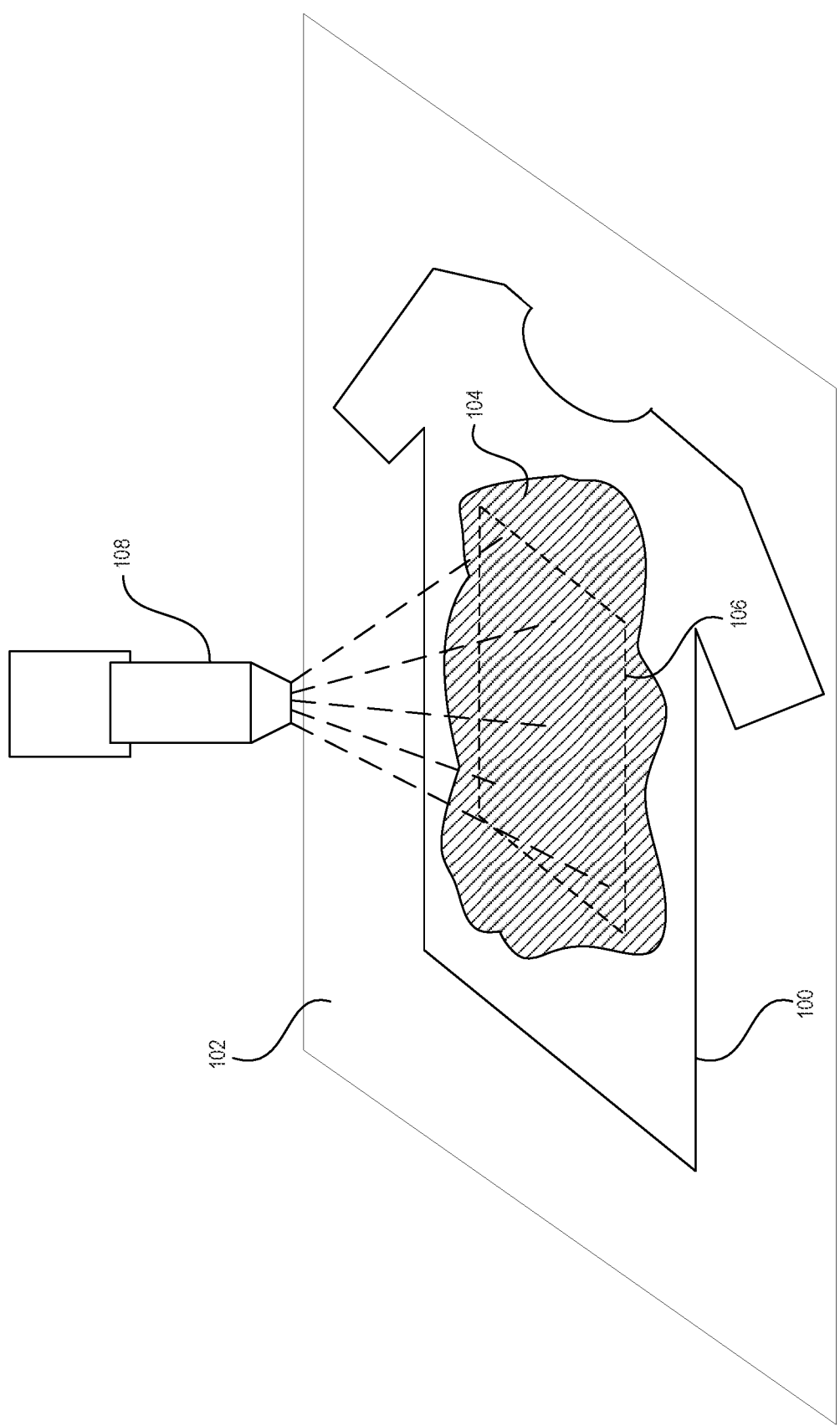
FIG. 1 illustrates an exemplary setup for applying heat to dry a garment piece, according to one embodiment.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein provide a heating system with thermal-visual servoing. The heating system can include a directional and movable heat source and a thermal camera. When the heat source heats an object, the thermal camera captures thermal images of the object. Temperature distribution information can be extracted from the thermal images and can be used as a feedback signal to facilitate servo control of the position of the heat source to achieve a desired heating result. This technique can be used to dry garment pieces during the DTG process. Additional applications (e.g., in automated food processing) are also possible.

Localized Garment Pretreatment and Drying

Pretreatment of garment pieces during the DTG process typically starts with a wetting process where a pretreatment solution is applied to the garment piece. In certain applications, the printing itself can be a dry process, and the garment piece is dried prior to printing. In other applications, the printing can be a wet process, and ink can be applied directly onto the wet surface. Regardless of the wet or dry condition of the printing process, the garment piece needs to be dried post printing.

Drying the garment piece typically involves heat application. Conventional approaches for drying garment pieces (either before or after the printing) use machines operating like an oven that bake the entire garment piece (e.g., a T-shirt). In recent years, improvements have been made to the pretreatment process. Instead of wetting the entire garment piece (or spraying the whole surface of the to-be-printed garment piece), only a limited area (i.e., the to-be-printed area) is wetted. Applying heat to the entire garment piece may lead to wasted process time and energy. Moreover, the uneven heating of the garment piece can degrade the printing quality.

To save time and energy and to ensure high quality prints, the present inventive system can provide localized heating with thermal-visual servoing. The heating system can include a movable, directional heat source that can apply localized heat only to the pretreated or wetted area on the garment surface. In further embodiments, the heating system can include a focusing mechanism that can focus the heat energy. The focused heat can raster across the pretreated area. To increase the heating efficiency and uniformity and to ensure the printing quality, the heating system can also include a machine-vision module that can provide thermal-vision feedback to guide the heat application. The machine-vision module can include infrared (IR) imaging sensors (e.g., thermal cameras) and, optionally, visible imaging sensors (e.g., red-green-blue (RGB) cameras) and/or three-dimensional (3D) imaging sensors capable of providing depth information (e.g., depth cameras). The RGB camera and depth camera can be integrated into a single device to provide RGB-D images. Outputs from the IR imaging sensors can be used to generate a time-varying temperature map for the pretreated area. The time-varying temperature map can be used to determine an optimal temperature for each pixel location and guide the movement of the heat source. More specifically, the rate of temperature change at each pixel location can be determined, and such rate is key in determining whether the piece of garment is dry or not. A number of servoing strategies can be used to control the movement of the heat source.

FIG. 1 illustrates an exemplary setup for applying heat to dry a garment piece, according to one embodiment. In FIG. 1, a to-be-printed garment piece (e.g., a T-shirt) 100 is placed on a flat working surface 102. Garment piece 100 is flattened with a portion of its surface (e.g., area 104) pretreated. Pretreated area 104 can be wetted by a solution used to enhance the bonding between the ink and the fabric. In certain applications, after applying the pretreatment solution and before printing, pretreated area 104 is dried. In certain applications, pretreated area 104 is dried only after printing. FIG. 1 also shows a printed area 106, which is typically smaller than pretreated area 104.

Drying pretreated area 104 can involve applying heat. In some embodiments, a directional heat source 108 can be used to apply heat to pretreated area 104. Unlike a convection oven that heats up the entire garment piece, directional heat source 108 only applies heat to a target area (e.g., area 104) on the garment piece, thus consuming less time and energy. Different types of heat sources can be used to dry pretreatment area 104. According to some embodiments, directional heat source 108 can include one or more heating mechanisms such as a heat gun, a blow dryer, an IR heater (e.g., a heat lamp), etc. Heat source 108 can be configured to provide adequate heating, which can dry pretreated area 104 in a reasonable amount of time (e.g., less than a few minutes) without causing damage to the printed pattern or garment piece 100. For example, the amount of power provided to heat source 108 and the distance between heat source 108 and the surface of garment piece 100 can be carefully configured to achieve the aforementioned goal of adequate and speedy drying without damaging the print or fabric.

In the example shown in FIG. 1, directional heat source 108 can be stationary and can emit heat to the entire pretreated area. However, applying heat to a relatively large area can be less energy-efficient, and it may be desirable to focus the heat on a smaller area and raster the heat application across the wet or pretreated area. To do so, a movable, directional heat source can be used.

Figure 2:
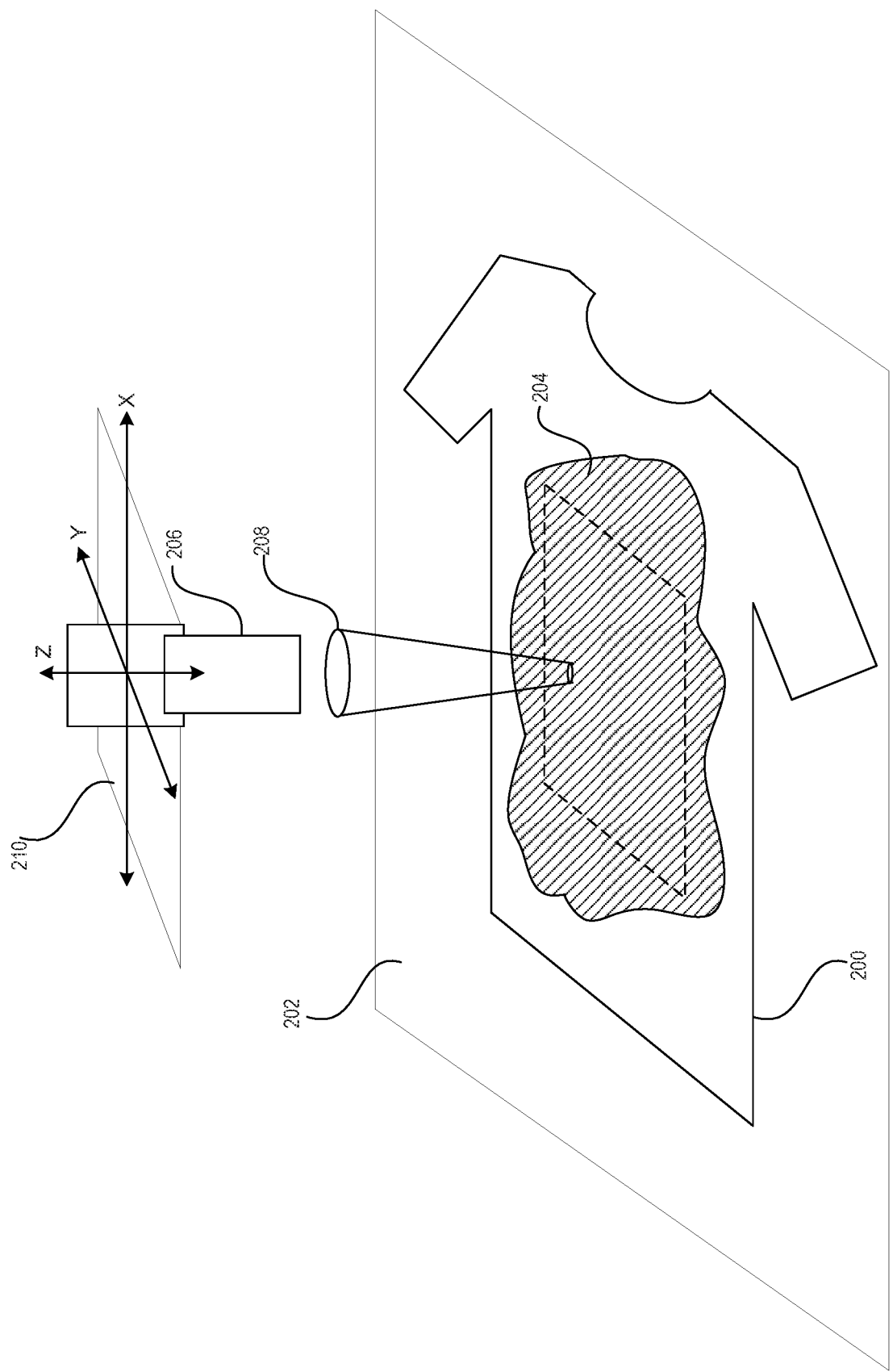
FIG. 2 illustrates an exemplary setup for applying heat using a movable, directional heat source, according to one embodiment.

FIG. 2 illustrates an exemplary setup for applying heat using a movable directional heat source, according to one embodiment. FIG. 2 shows a to-be-printed garment piece 200 flattened and placed on a working surface 202, with a pretreated wet area 204 facing up. FIG. 2 also shows a heat source 206 and a focusing mechanism 208. In one embodiment, heat source 206 can be an IR heater, and focusing mechanism 208 can be an optical lens operating in the IR range to focus the IR light on a small region. In alternative embodiments, heat source 206 can blow hot air and focusing mechanism 208 can include a tube that guides the hot air to a smaller region in pretreated area 204. Alternatively, heat source 206 can be placed sufficiently close to the surface of garment piece 200 such that heat can be applied to a very small region, even without using a focusing mechanism.

Because heat source 206 now only applies heat to a small and localized region, to dry off the entirety of pretreated area 204, heat source 206 can move from one location to another (e.g., in a raster fashion). In the example shown in FIG. 2, heat source 206 can be attached to a gantry system 210 that facilitates movements of heat source 206 (along with focusing mechanism 208 when applicable) in the X-Y plane. In addition, heat source 206 may also move along the Z-axis to be closer to or further away from the surface of garment piece 200. In one embodiment, heat source 206 may move along the Z-axis, causing garment piece 200 to be in and out of focus. In such a case, heat source 206 may apply heat to an area of a varying size, and the heat intensity (i.e., the amount of heat received at each unit area) can also vary depending on whether garment piece 200 is in or out of focus. Note that, when focusing mechanism 208 is not used, moving heat source 206 closer can reduce the size of the heated area but increase the heat intensity, whereas moving heat source 206 further away can increase the size of the heated area but decrease the heat intensity. Because the heat intensity can correlate with the amount of time needed to dry a particular spot or the fabric temperature at the particular spot, one can control the drying time and temperature of that spot by moving heat source 206 along the Z-axis.

Moving heat source 206 from one location to another may take time. Hence, there is a tradeoff between the resolution of heating and the time needed to dry garment piece 200. If the resolution is high, heat from heat source 206 is focused on a smaller region, which may speed up the drying process at that smaller region but would require heat source 206 to be moved to many different locations. In some embodiments, heat source 206 may move according to a predetermined raster scan pattern. For example, heat source 206 may move to a predetermined location and apply heat locally for a predetermined duration before moving to a next location. This process can repeat periodically until pretreatment region 204 is completely dry. In alternative embodiments, heat source 206 may wait until a local region is dry before moving to a next region.

In addition to a gantry system, the heat source can also be attached to a robotic arm (e.g., a multi-joint robotic arm with an extensive range of movement and multiple degrees of freedom). In some embodiments, the robotic arm can move the heat source in X, Y, and Z directions, similar to what is shown in FIG. 2. In further embodiments, the robotic arm can have additional freedoms of movement (e.g., pitch, yaw, and roll).

Another mechanism for moving the heat source can include a ball-joint unit. A ball-joint unit can include a spherical bearing (the ball member) allowing free rotation of a connected arm (the rod member) in two planes at the same time while preventing translation in any direction. More specifically, a heat source can be attached to the rod member and can rotate in both the horizontal plane (i.e., the plane parallel to the garment surface) and the vertical plane.

Figure 3A:
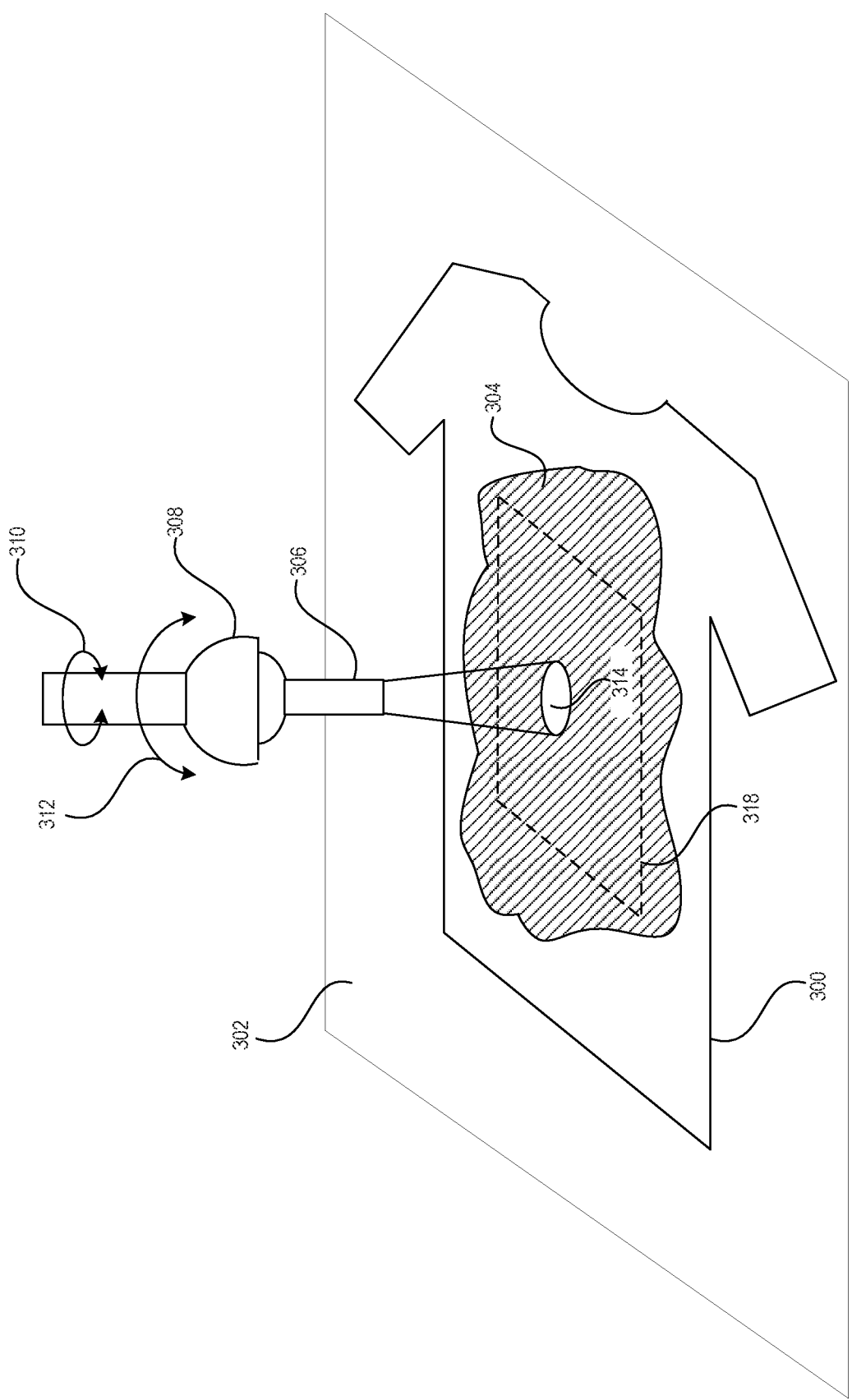
FIG. 3A illustrates an exemplary setup for applying heat using a heat source attached to a ball-joint unit, according to one embodiment.

FIG. 3A illustrates an exemplary setup for applying heat using a heat source attached to a ball-joint unit, according to one embodiment. In FIG. 3A, a garment piece (e.g., a T-shirt) 300 is placed on a flat working surface 302, and an area 304 has been pretreated or wetted, facing upward. Wetted area 304 is larger than a print area 318 upon which a predetermined pattern will be printed by inkjetting. A heat source 306 is attached to a ball-joint 308. Ball-joint 308 can be configured such that heat source 306 can rotate in the horizontal plane (as indicated by an arrow 310) and the vertical plane (as indicated by an arrow 312). In FIG. 3A, heat source 306 is substantially aligned to the vertical direction, and the heat emitted by heat source 306 can be confined to a region 314, which is located approximately at the center of wetted area 304. The size of region 314 can depend on the distance between heat source 306 and the garment surface. If a focusing mechanism is used, the size of region 314 can depend on whether heat source 306 is in focus.

Figure 3B:
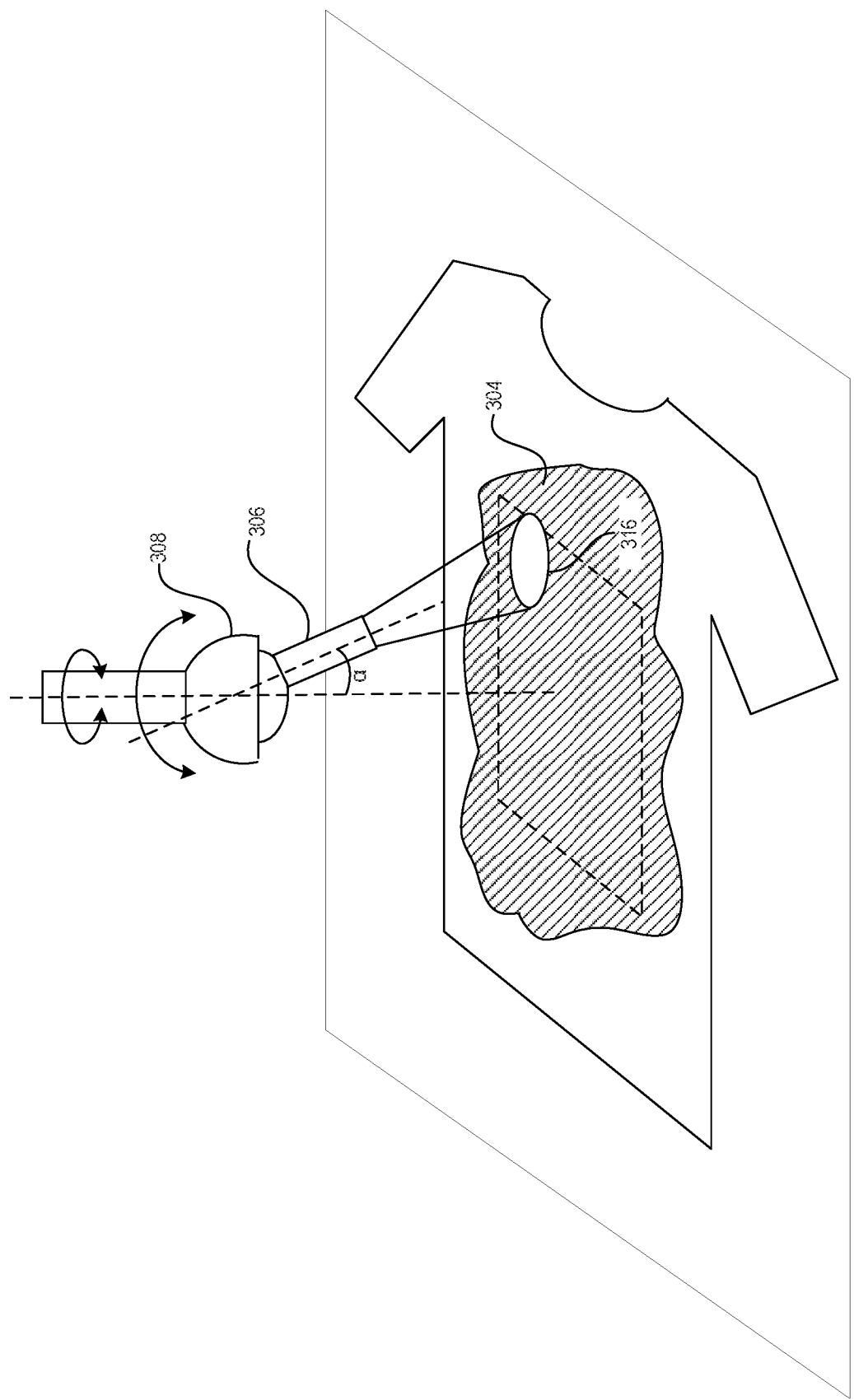
FIG. 3B illustrates the rotation of the heat source attached to the ball-joint unit, according to one embodiment.

FIG. 3B illustrates the rotation of the heat source attached to the ball-joint unit, according to one embodiment. In FIG. 3B, heat source 306 attached to ball-joint 308 is rotated in both the horizontal plane and the vertical plane such that the central axes of heat source 306 and ball-joint 308 form an angle $\alpha$. The heat emitted by heat source 306 can be confined to a region 316, which is located approximately near an edge of wetted area 304. As can be seen by comparing FIG. 3B with FIG. 3A, as heat source 306 moves away from the central axis of ball-joint 308, the distance between heat source 306 and the garment surface increases; as a result, region 316 is larger than region 314. As discussed previously, if the power outputted by heat source 306 remains the same, a larger heated region means a lower heat intensity.

Figure 3C:
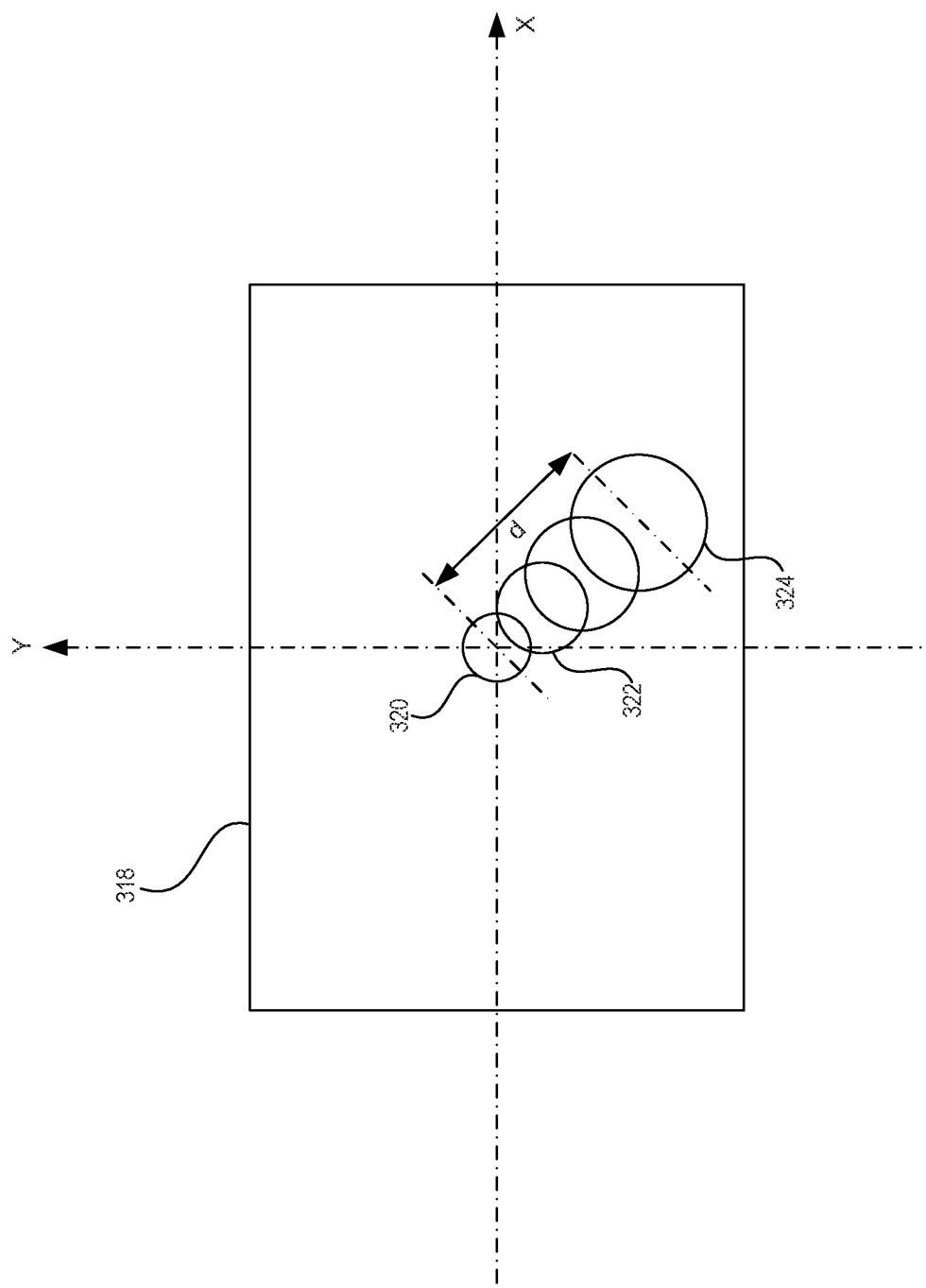
FIG. 3C illustrates the size variation of the heated regions resulting from the rotations of the heat source, according to one embodiment.

FIG. 3C illustrates the size variation of the heated regions resulting from the rotations of the heat source, according to one embodiment. For simplicity of illustration, FIG. 3C shows the top view of print area 318. FIG. 3C also shows a number of heated regions (e.g., regions 320, 322, and 324). Each heated region can have a substantially circular shape. In this example, region 320 can be located at the center of print area 318, which can correspond to the center location of the ball-joint (e.g., region 320 can be located directly beneath the ball-joint). According to FIG. 3C, the size of each heated region increases as the heat source rotates about the center of the ball-joint and the heated region moves away from its central location. For example, heated region 322 is larger than heated region 320, and heated region 324 is larger than heated region 322. The heat intensity may decrease as the heat source rotates away from its central location. The larger the distance between the center of a heated region and the center point directly beneath the ball-joint (e.g., indicated as distance "d" in FIG. 3C), the larger the heated region and the lower the heat intensity. In other words, when the ball-joint is used to facilitate movements of the heat source, it may take longer to dry edges of the wetted region.

FIGS. 1-3C demonstrate that a single heat source is used to dry the garment surface. In practice, multiple individual heat sources can be used for drying. Alternatively, a single heat source can include multiple individually controlled sub-units. The disclosed can also be used to directly or indirectly control the individual heat sources or sub-units. Detailed descriptions of the multiple heat sources or sub-units can be found in co-pending U.S. patent application Ser. No. 17/845,371, entitled "Drying and Curing Systems," filed Jun. 21, 2022, by Christopher Foster, Andrew Xu, and Yaala Belau, the disclosure of which is herein incorporated by reference in its entirety.

Thermal-Visual Servoing

In general, applying heat to localized regions and moving the heated regions across the wetted area can improve heat efficiency and uniformity. However, the inherent nonuniformity in the thickness of the garment material and in the print patterns (during the post-print drying) may negatively affect the print quality. For example, thinner fabric dries faster than thicker fabric, and applying the amount of heat may cause a location on the garment piece with thinner fabric to overheat, degrading, even damaging the fabric. Similarly, the printed pattern may have one area with lots of ink and another area with little ink, and it may take longer to dry the area with more ink. If heat is applied to both areas for the same duration, the area with less ink may overheat, causing degradation/damage to the printed pattern or the fabric underneath. It is desirable to have a mechanism that can provide feedback regarding the drying state of different locations on the garment piece. According to some embodiments, a thermal servoing mechanism can be used to control the movement of the heat source using feedback extracted from a thermal sensor (e.g., a thermal camera). More specifically, thermal images of the garment surface can be obtained, and temperature readings at the pixel level as a function of time can also be obtained. Based on the temperature reading, the system can determine whether a pixel location has reached the optimum drying condition (or the optimum temperature). If so, the heat source can be moved away from heating the pixel location; otherwise, the heat source can remain at its current location to continue heating the pixel location. The active control of the movement of the heat source can ensure that the pretreated area on a garment piece is properly dried before and/or after printing without overheating. Not only can this approach reduce the amount of energy and time needed to dry the garment piece, it can also ensure the quality of the printing and prevent damage to the garment piece.

Figure 4:
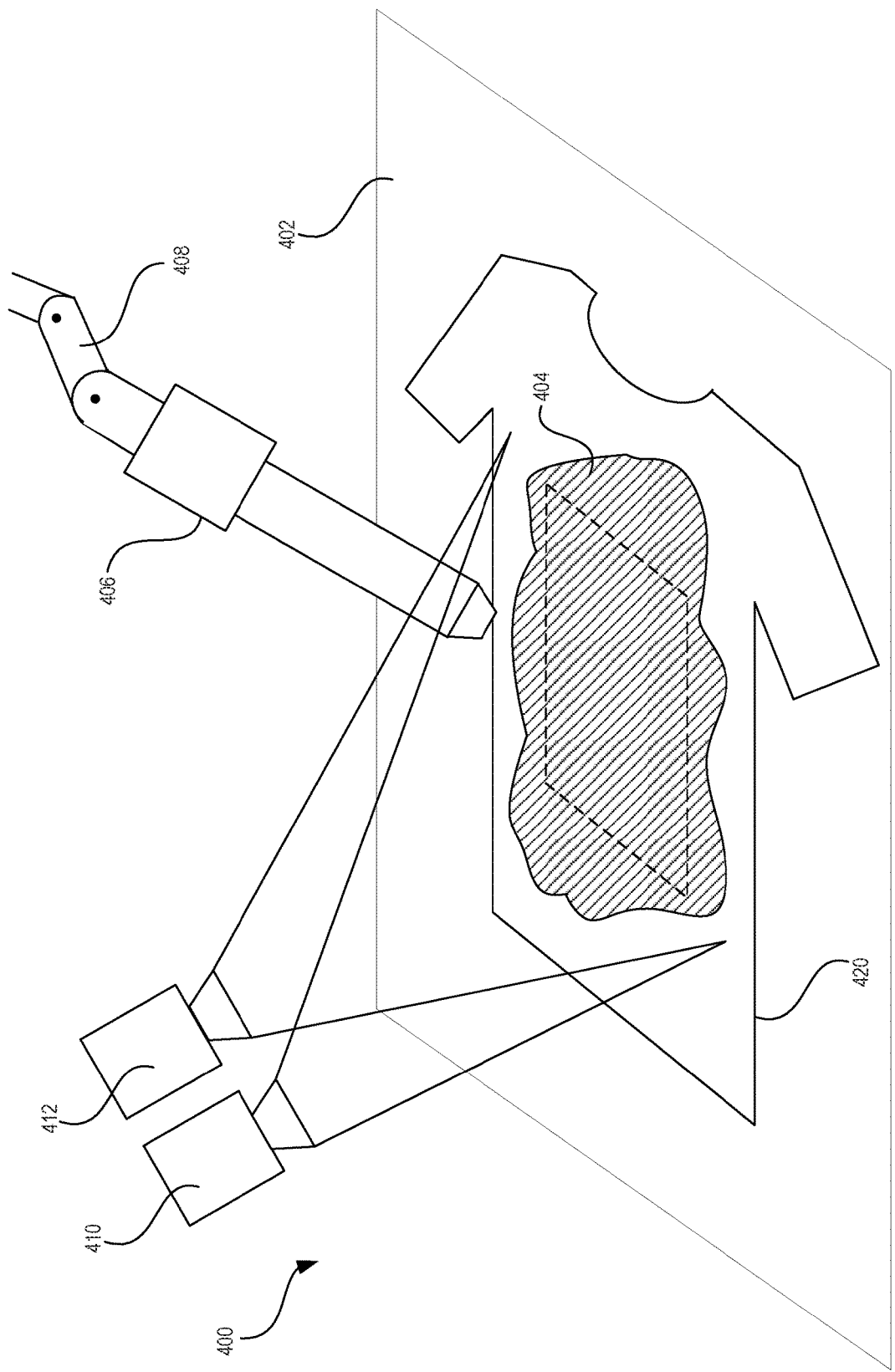
FIG. 4 illustrates an exemplary garment-drying station for drying a garment piece with the assistance of a thermal-visual-servoing mechanism, according to one embodiment.

FIG. 4 illustrates an exemplary garment-drying station for drying a garment piece with the assistance of a thermal-visual-servoing mechanism, according to one embodiment. In FIG. 4, a garment-drying station 400 can include a working surface 402. A to-be-dried garment piece 420 is laid flat on working surface 402. Garment piece 420 can include a wetted area 404 that faces upward. Garment-drying station 400 can include a directional and movable heat source 406 placed above wetted area 404, emitting heat (either through radiation or by blowing hot air) toward wetted area 404. Directional and movable heat source 406 can be attached to a motion module configured to move heat source 406 across wetted area 404. In the example shown in FIG. 4, heat source 406 is attached to a multi-joint robotic arm 408 having multiple degrees of freedom.

Moreover, garment-drying station 400 can include a number of cameras (e.g., cameras 410 and 412) positioned above working surface 402 and configured to capture images of wetted area 404. In some embodiments, the cameras can include at least one IR or thermal camera configured to capture thermal images of wetted area 404. The cameras can optionally include an RGB camera configured to capture color images of wetted area 404 and/or a depth camera configured to capture depth images. For example, camera 410 can be a thermal camera and camera 412 can include an RGB and/or a depth camera. The fields of view (FOVs) of cameras 410 and 412 can overlap and can each include wetted area 404. In some embodiments, when both types of cameras are used, the thermal camera and the RGB camera can be calibrated such that every RGB pixel in RGB camera 412 can correspond to a thermal pixel in thermal camera 410. Similarly, the depth camera can also be calibrated such that a pixel in a thermal image and/or a pixel in a visible-light image can correspond to a pixel in a depth image. As shown in FIG. 4, to ensure that the views of the cameras are not blocked by heat source 406, the cameras and heat source 406 can be placed off center, with heat source 406 approaching garment piece 420 from one side and the cameras viewing garment piece 420 from the opposite side. It is also possible to have a different arrangement. For example, one or more heat sources can be positioned directly above a center location of garment piece 420, whereas the cameras can view garment piece 420 from an off-center location. In the example shown in FIG. 4, thermal camera 410 and RGB camera 412 are positioned adjacent to each other, viewing garment piece 420 from substantially the same direction. It is also possible to place thermal camera 410 and RGB and/or depth camera 412 at different locations so they can view garment piece 420 from different directions, as long as their FOVs are somewhat overlapping. In some embodiments, to avoid occlusion caused by the heat sources, multiple thermal cameras and/or multiple RGB cameras can be used, and the captured images can be combined to provide thermal and RGB images of the entire wetted area 404.

As heat source 406 heats up wetted area 404, thermal camera 410 captures thermal images of wetted area 404, and temperature information at the pixel level can be extracted from the thermal images. As the drying process continues, the temperature at a pixel location may change over time. If the drying process occurs prior to printing, the wetted area contains the pretreatment solution; if the drying process occurs after printing, the wetted area contains a mixture of ink and the pretreatment solution. Once exposed to heat source 406, the garment fabric, the pretreatment solution, and the ink (when applicable) will be heated, and the temperature at a pixel location may rise. Note that the temperature change may be nonlinear, because both the liquid and the fabric are heated.

Figure 5:
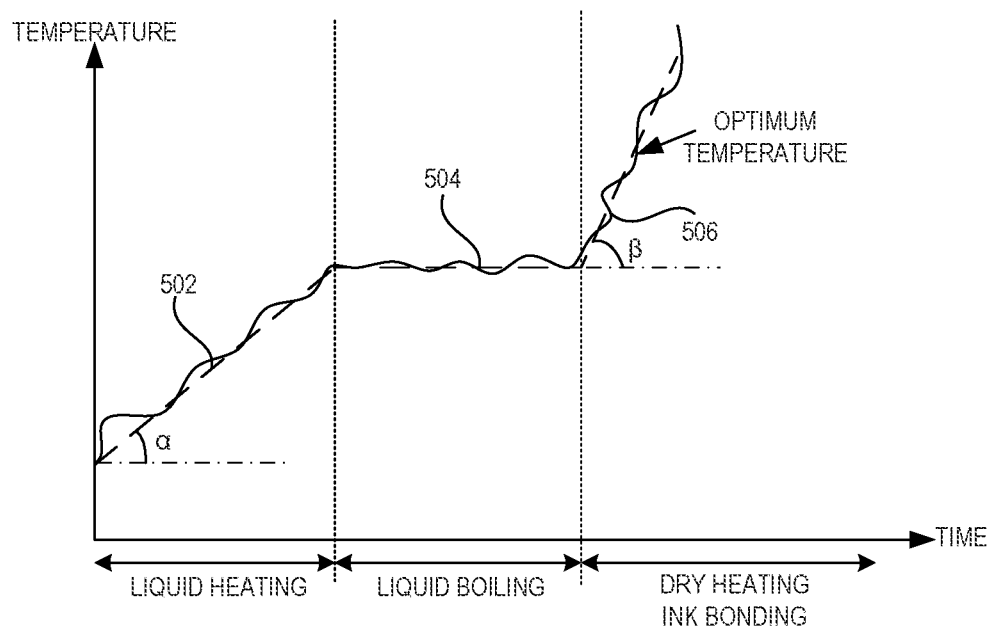
FIG. 5 illustrates an exemplary temperature change as a function of heating time, according to one embodiment.

FIG. 5 illustrates an exemplary temperature change as a function of heating time, according to one embodiment. At an initial liquid-heating stage 502, the temperature may rise as a substantially linear function of time. This is the stage when the pretreated area is still wet and the liquid (the pretreatment solution and the ink) is being heated. At a phase-transition stage 504, the temperature remains substantially constant. This is the stage when the liquid is boiling. At the last dry-heating stage 506, the temperature may rise again as a substantially linear function of time. At this stage, the fabric is dry and being heated up. Due to the difference in thermal capacity between the liquid and the garment fabric, the slope of the two linear stages 502 and 506 can be different. Dry-heating stage 506 typically has a steeper slope compared with liquid-heating stage 502 (i.e., tan $\beta$>tan $\alpha$). The controller module of the heating system can keep the temperature readings of each pixel location in the computer memory and analyze the drying stage of each pixel location based on the rate of change (i.e., the slope) of temperature. For example, by calculating the slope of the temperature vs. time curve, the controller can determine whether a pixel location on the fabric is in the dry-heating stage. The elevated temperature at dry-heating stage 506 can facilitate bonding between the ink and the fabric. However, if the heating is prolonged, the temperature continues to rise, and the print pattern and/or the garment fabric may be damaged. According to some embodiments, the heating can stop when the fabric reaches an optimal temperature, which typically occurs in dry-heating stage 506. Stopping heating the garment piece at the optimal temperature can ensure good bonding between the ink and the garment fabric without damaging the print pattern and/or the fabric. Moreover, stopping the heating process at the optimal temperature can save time and energy. Moreover, this controlled drying process can improve the hand feel (e.g., providing a softer feel) of the printed garment.

In some embodiments, determining the optimal temperature for a location may involve using a machine-learning technique. More specifically, a machine-learning model can be trained using previously dried garment pieces and data collected during quality control (e.g., fatigue testing result). The input of the machine-learning model can be the fabric material and optionally the print pattern, and the output of the model can be the temperature map for the print area. Based on the fatigue testing results (e.g., whether a certain temperature causes failure in the print pattern or fabric), the model can learn the optimal temperature for different types of fabric materials and patterns.

The nonuniformity in the fabric thickness, in the ink distribution, and possibly in the heat distribution can all contribute to the nonuniform distribution of temperature across the garment surface. The temperature distribution information can be extracted from images captured by the thermal camera(s). More specifically, temperature information at each pixel location can be obtained and used as a feedback signal to control the movements of the heat source (e.g., to steer the heat source to or away from a location or to bring the heat source in and out of focus) to achieve the desired heating/drying result. For example, by controlling the duration and intensity of the heat source at each location, a uniform temperature distribution across the garment surface can be achieved. Alternatively, controlling the duration and intensity of the heat source can also achieve a specific temperature distribution pattern (e.g., certain locations may require a higher temperature than other locations).

Figure 6:
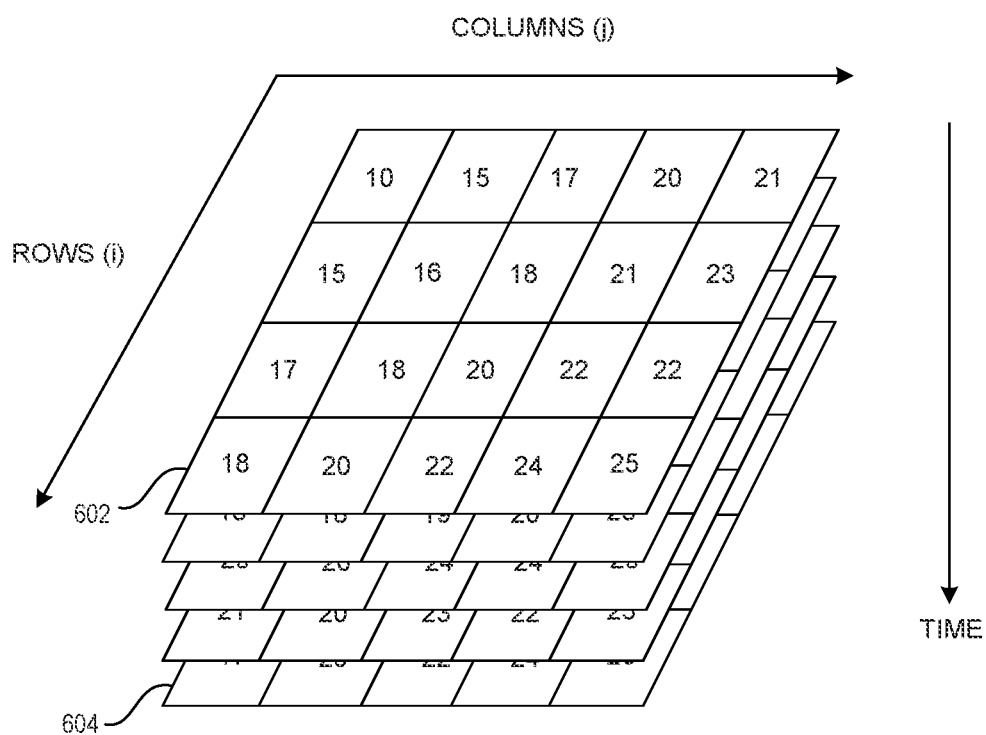
FIG. 6 illustrates exemplary temperature readings extracted from thermal images, according to one embodiment.

In some embodiments, a temperature reading can be obtained for each pixel from the thermal images. The temperature readings can be recorded as a two-dimensional (2D) array for each time instant. FIG. 6 illustrates exemplary temperature readings extracted from thermal images, according to one embodiment. In FIG. 6, temperature readings for each pixel location at each time instant can be organized into a 2D array (e.g., 2D arrays 602 and 604). In one embodiment, each array can correspond to a thermal image captured at a particular time instant. For example, 2D array 602 may correspond to a thermal image captured at an earlier time instant, and 2D array 604 may correspond to a thermal image captured at a later time instant. In an alternative embodiment, each array can correspond to multiple thermal images captured during a particular time interval, and the temperature reading can correspond to the average temperature within the particular time interval. For example, 2D array 602 may correspond to thermal images captured during an earlier time interval, and 2D array 604 may correspond to thermal image captured at a later time interval. The time intervals may or may not overlap. In some embodiments, each number value in the 2D array corresponds to an average temperature for a group of pixels. In other words, the original thermal pixels can be divided into a number of cells, with each cell comprising multiple pixels. For example, a cell can include an array of 10×10 pixels. Other configurations are also possible. The temperature reading of a cell can be the average temperature of all pixels in the cell. In the example shown in FIG. 6, depending on the implementation, a number at a particular column and a particular row (e.g., column j and row i) may be the temperature for a pixel location or a cell location.

Regardless of the resolution (pixel level or cell level), the temperature reading at each location varies with time. The temperature-time relationship can be similar to the one shown in FIG. 5. As discussed previously, the temperature vs. time graph can be used to determine the optimum temperature for each location (pixel or cell location) on the print surface. The system can further use the temperature information to control the movement of the heat source in order to obtain a desired heating/drying result.

The temperature graph shown in FIG. 5 describes a single drying process, where the pretreatment solution and ink are dried together. It is also possible that there are multiple (e.g., two) drying processes, and the corresponding temperature graph can be different from the one shown in FIG. 5. In one example, after pretreatment, the pretreated area is dried before printing. After the pretreated area is dried, ink can be sprayed on the print area, and the printed area can be dried one more time. The temperature curve for each drying process can be similar to one shown in FIG. 5, except that the slope for the initial liquid-heating stage may be different, because the liquid content in each drying process includes either pretreatment solution or ink. The disclosed localized, controlled drying approach can be used in both drying processes.

FIGS. 1-4 use drying a garment piece during the DTG process as examples to describe the operations of a heating system implementing thermal-visual servoing. In practice, the disclosed thermal-visual-servoing techniques can have many applications in many different industries. For example, these techniques can be useful in the culinary world where a well-controlled heating process is desirable, such as for baking pizzas, baking cookies, grilling hamburgers or steaks, etc. Another example is electronic industries where circuit boards may need to be heated at specific locations to facilitate soldering. In addition to heating, the same technique can also be used to control the temperature during a cooling process. For example, fertility clinics can use a similar technique to control the temperature change while freezing the eggs or sperm to prevent the formation of ice crystals in the organic material. A similar technique can also be used to control the quality of ice cream. Other applications of the disclosed thermal-visual-servoing techniques can include therapeutic applications, such as cardia ablation.

Figure 7:
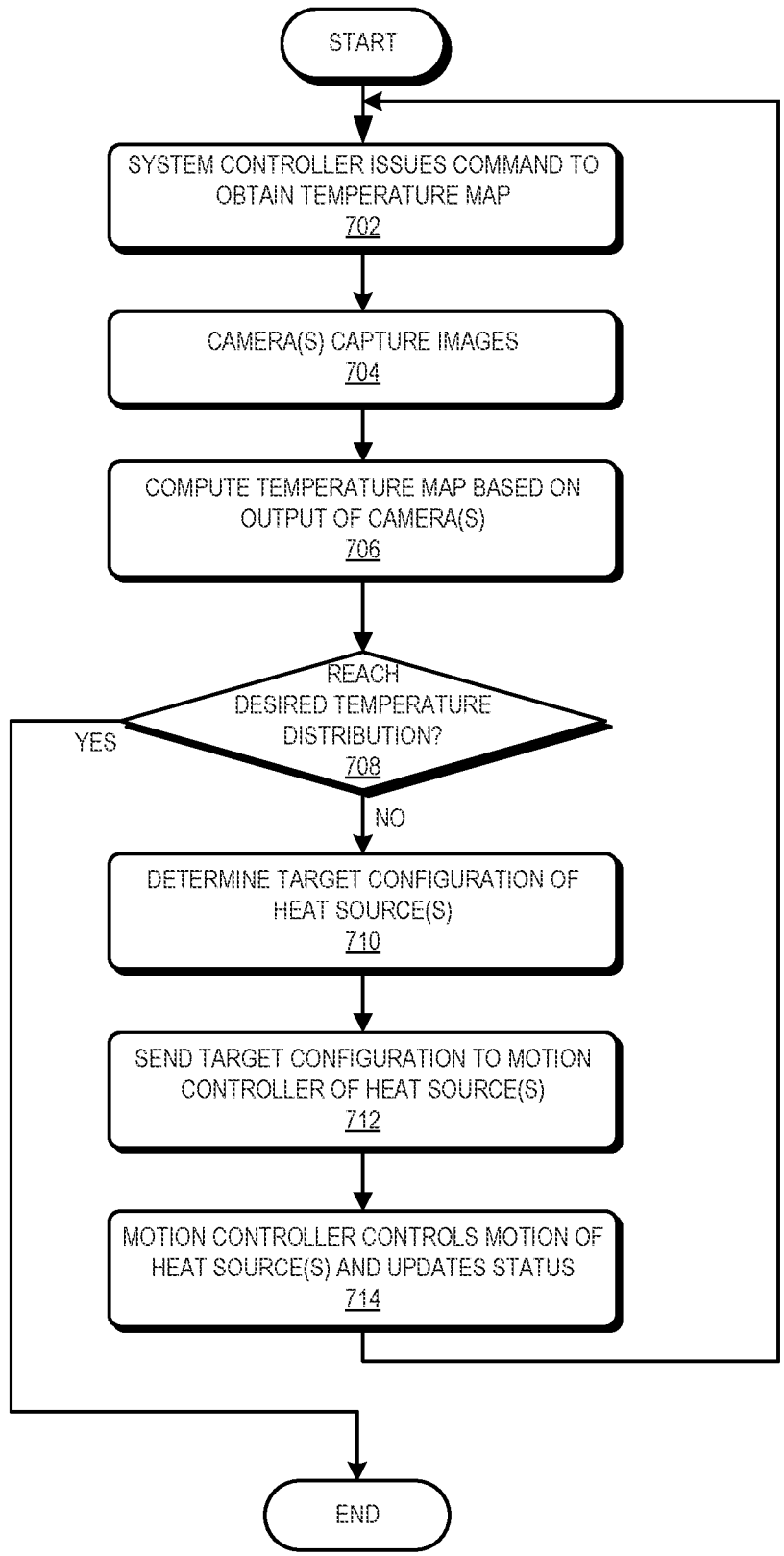
FIG. 7 presents a flowchart illustrating an exemplary heating process, according to one embodiment.

FIG. 7 presents a flowchart illustrating an exemplary heating process, according to one embodiment. During operation, the controller of the heating system (which can include heat source(s) and cameras(s)) can issue a command to the cameras to obtain the current temperature map associated with an object (operation 702). The cameras can include thermal cameras and optionally RGB and/or depth cameras. The object can be a garment piece going through the DTG process. An RGB camera can capture RGB images of the wet area on the garment piece as a region of interest, a depth camera can capture depth images, and a thermal camera can capture thermal images of the wet area. The RGB camera and depth camera can be integrated into a single device to provide RGB-D images. In one embodiment, these cameras can be calibrated such that each RGB/depth pixel is assigned or mapped to a thermal pixel. For example, they may have substantially the same FOV, and a pixel location in the FOV of the RGB/depth camera corresponds to a pixel location in the FOV of the thermal camera. Calibrating the thermal and RGB/depth cameras can allow inference of the temperature of the print pattern at the pixel level. This is important because different print colors may have different heat capacities and be heated to different temperatures. In some embodiments, calibrating the cameras can include extracting and comparing features in the thermal and RGB/depth images.

Upon receiving the command, the cameras (including at least a thermal camera and optionally an RGB and/or depth camera) can capture images of an area of interest (operation 704). In the examples of drying a pretreated garment piece before or after printing, the area of interest can be the pretreated or print area. A temperature map can then be computed based on the thermal images (operation 706). Depending on the actual implementation, the spatial resolution of the temperature map can be at the pixel level or the cell level, where a cell comprises multiple pixels. Because the temperature changes over time, the system can also generate a temperature-time graph for each pixel or cell location based on the current temperature reading and previous temperature readings. The temperature map can be computed by the thermal camera or by a separate module (e.g., a module within the controller of the heating system) that processes the thermal images and extracts the temperature readings.

The controller of the heating system can then determine whether the desired temperature distribution is achieved based on the temperature map (operation 708). For example, for each pixel or cell location, the system can determine whether the current temperature reading substantially matches the optimal temperature determined based on the temperature-time graph. In addition, the system can determine whether the distribution of temperature readings over the area of interest meets a predetermined uniformity requirement (e.g., the standard deviation is within a predetermined range). If the desired temperature distribution has been achieved, the process ends. The heat source can be turned off or the object can be removed so it is no longer being heated. In certain applications, only the temperature at particular locations or particular features (e.g., solder locations of a circuit board) are considered. In such cases, the system can use the RGB images to identify the pixel locations of those features and then determine the temperature of those features based on the temperature values at the corresponding pixel locations in the thermal images.

If the desired temperature distribution has not been achieved, the system determines the target configuration of the heat source(s) (operation 710). The target configuration of a heat source can include the location and intensity of the heat source. A number of approaches can be used to determine the target configuration of the heat source. In some embodiments, a machine-learning technique can be used to model the behavior of the heat source. In further embodiments, the system can implement reinforcement learning (RL) using one or more of the following rewards: the speed of heating for a predetermined change in temperature and heating area, the overall time to achieve optimal temperature for all pixels, and the energy usage. In some embodiments, the system uses graph-based planning to determine the heat source configuration with expected thermal behavior mapped to graph properties and updated as the heating system operates.

The controller of the heating system can then send the determined target configuration of the heat source(s) to the motion controller of the heat source(s) (operation 712). The motion controller can then control movements of the heat source(s) and update their status after the movement (operation 714). The process can then return to operation 702.

Figure 8:
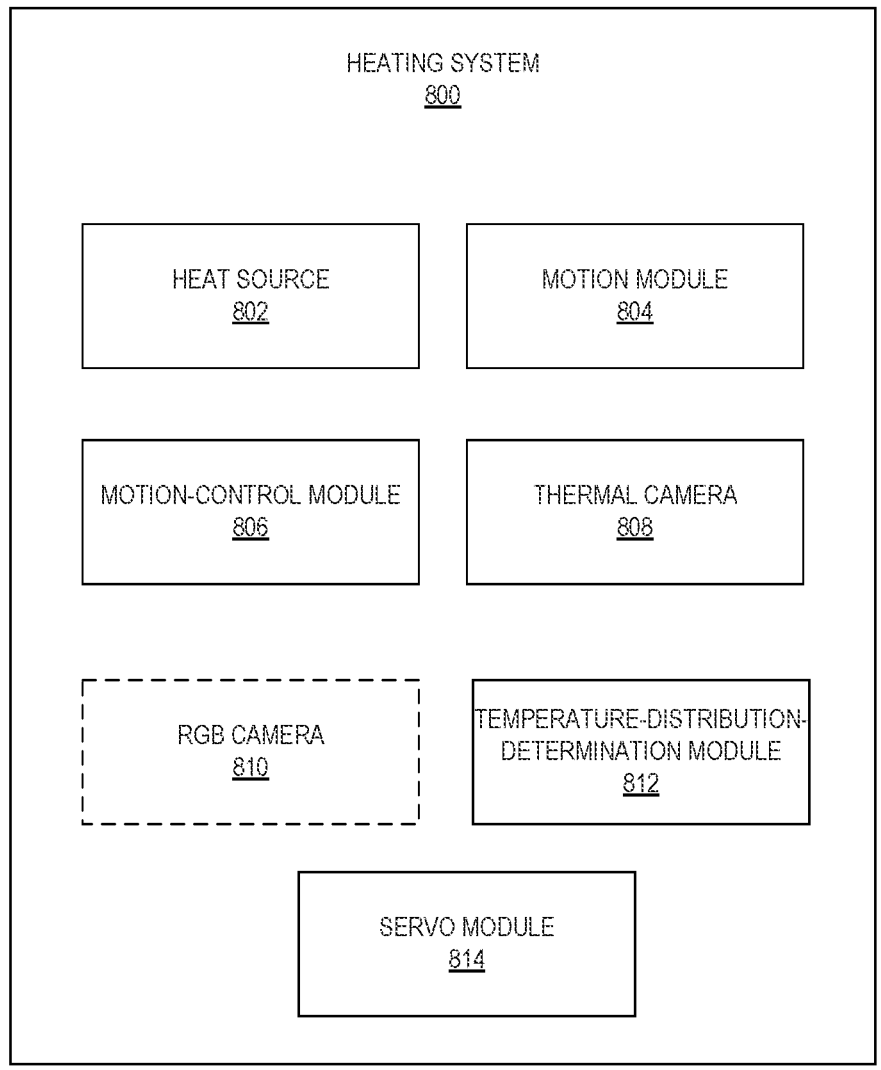
FIG. 8 illustrates a block diagram of an exemplary heating system, according to one embodiment.

FIG. 8 illustrates a block diagram of an exemplary heating system, according to one embodiment. Heating system 800 can include a heat source 802, a motion module 804, a motion-control module 806, a thermal camera 808, an optional RGB and/or depth camera 810, a temperature-distribution-determination module 812, and a servo module 814.

Heat source 802 can be directional and configured to emit heat to a confined region on a to-be-heated surface. Heat source 802 can include a heating apparatus implementing a non-contact heating mechanism, such as radiation, blowing hot air, and their combination. When radiation is used, heat source 802 can also include a focusing mechanism (e.g., a lens system operating in the IR range). Examples of heat source 802 can include but are not limited to: a heat gun, a blow dryer, a heat lamp, an array of heat lamps, and a combination thereof.

Motion module 804 can be responsible for moving heat source 802 to different locations such that heat source 802 can heat up different regions on the to-be-heated surface. Motion module 804 can include a moving member to which heat source 802 is attached. Examples of motion module 804 can include but are not limited to: a gantry system, a robotic arm, a ball-joint, etc. Motion-control module 806 can be responsible for controlling motion module 804, thus controlling the movement pattern of heat source 802.

Thermal camera 808 can be responsible for capturing thermal images of an area of interest while it is being heated by heat source 802. Optional RGB/depth camera 810 can be responsible for capturing RGB images of the area of interest. Thermal camera 808 and RGB camera 810 can be calibrated such that a thermal image can be correlated to an RGB image, with each thermal pixel corresponding to an RGB pixel. This way, the temperature of a printed pattern can be inferred at the pixel level, as inks of different colors may be heated to different temperatures due to their difference in thermal capacity. During operation, thermal camera 808 and RGB camera 810 can remain stationary. It is also possible they can be moved to different locations to obtain different views of the area of interest.

Temperature-distribution-determination module 812 can be responsible for determining the surface temperature of the area of interest while it is being heated. Temperature information can be extracted from the thermal images. In some embodiments, temperature-distribution-determination module 812 can generate a time-varying pixel- or cell-level temperature map based on thermal images captured over time. Both the temporal and spatial resolutions of the temperature map can be configured, depending on the practical need.

Servo module 814 can be responsible for implementing servo control of the position of the heat source based on the time-varying temperature map associated with the area of interest. Servo module 814 can implement one or more servoing strategies. In some embodiments, servo module 814 can implement a reinforcement learning (RL) technique using one or more of the following rewards: the speed of heating for a predetermined temperature change and a predetermined heating area, time needed to achieve an optimal temperature for all pixels, total energy usage, etc. In some embodiments, servo module 814 can execute a graph-based motion-planning algorithm to plan the motion of the heat source. During planning, the expected thermal behavior (e.g., the temperature distribution) can be mapped to graph properties and updated. The output of servo module 814 can include target configurations (e.g., positions, heat intensity, etc.) of heat source 802. Such information can be sent to motion-control module 806, which then controls motion module 804 to move heat source 802 to desired locations.

Figure 9:
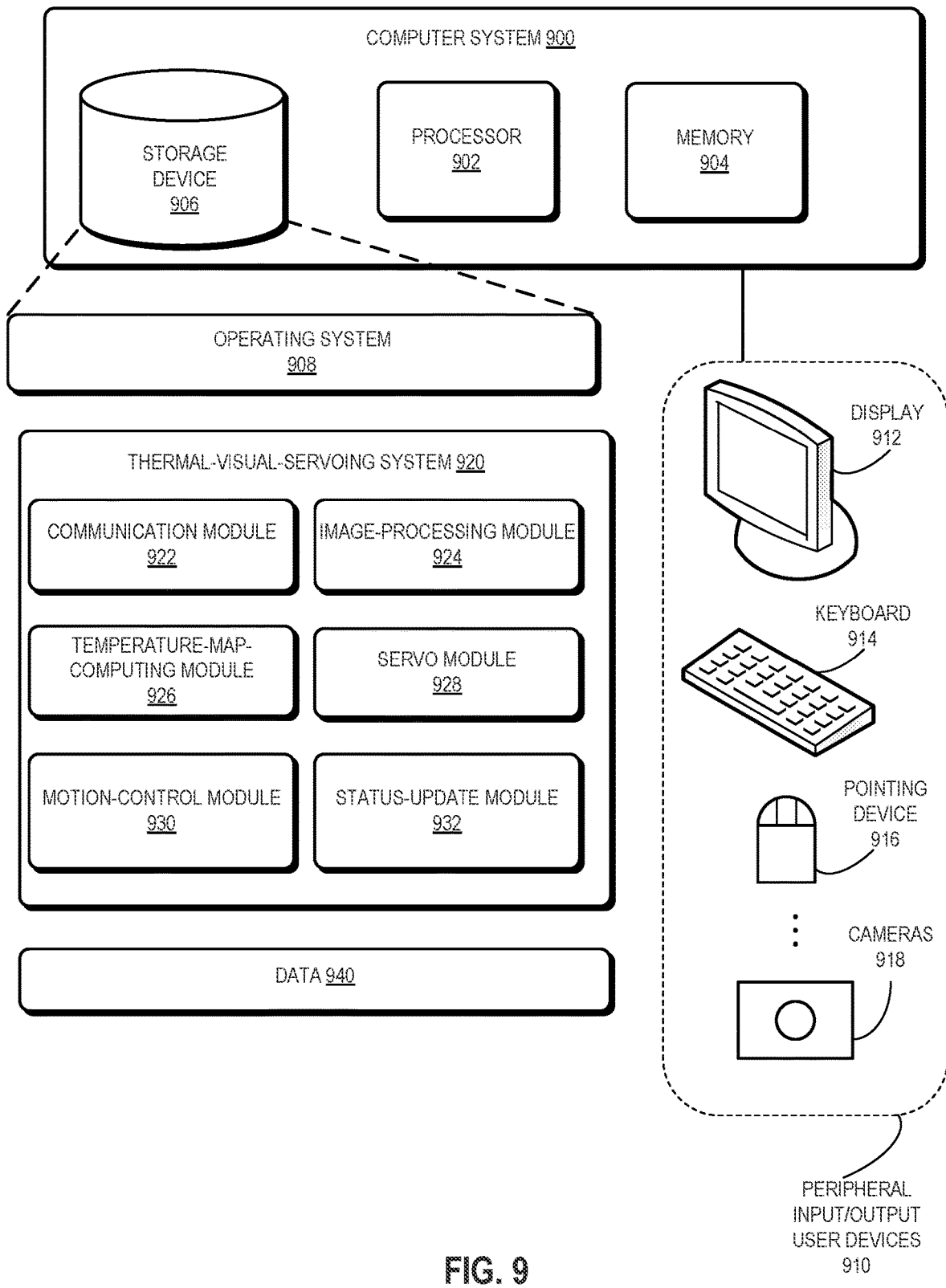
FIG. 9 illustrates an exemplary computer system for facilitating thermal-visual servoing of a heat source, according to one embodiment.

FIG. 9 illustrates an exemplary computer system for facilitating thermal-visual servoing of a heat source, according to one embodiment. In FIG. 9, computer system 900 can include a processor 902, a memory 904, and a storage device 906. Furthermore, computer system 900 can be coupled to peripheral input/output (I/O) user devices 910, e.g., a display device 912, a keyboard 914, a pointing device 916, and a plurality of cameras 918 (including both thermal and optional RGB cameras). Storage device 906 can store an operating system 908, a thermal-visual-servoing system 920, and data 940.

Thermal-visual-servoing system 920 can include instructions, which when executed by computer system 900, can cause computer system 900 or processor 902 to perform methods and/or processes described in this disclosure. Specifically, thermal-visual-servoing system 920 can include instructions for communicating with cameras to send instructions to and receive images from the cameras (communication module 922), instructions for processing images (including both thermal and RGB images) (image-processing module 924), instructions for computing temperature maps (temperature-map-computing module 926), instructions for implementing servo control based on the temperature maps (servo module 928), instructions for controlling the motion of a heat source (motion-control module 930), and instructions for updating the location status of the heat source (status-update module 932).

In some embodiments, the various modules in thermal-visual-servoing system 920, such as modules 922-932, can be partially or entirely implemented in hardware and can be part of processor 902. Further, in some embodiments, the system may not include a separate processor and memory.

In general, the disclosure describes a thermal-visual-servoing technique that can be used to facilitate controlled heating. While applying localized heat to an object (e.g., using a directional heat source), thermal images of the object can be captured, and a time-varying temperature map can be generated based on the thermal images. The time-varying temperature map can be used as feedback signals to a servo controller that controls the movement or position of the heat source. Various servoing strategies can be used, including RL-based modeling and graph-based motion planning. This way, a desired heating result (e.g., in terms of temperature values and distribution) can be achieved. The thermal images can also be correlated with RGB images. Information extracted from the RGB images (e.g., locations of certain features) can also be used to control the position of the heat source. The thermal images can also be correlated with depth images. Information extracted from the depth images (e.g., surface texture or thickness) can also be used to control the position of the heat source. In addition to heating processes, the same technique can also be used in other processes requiring temperature control, such as a cooling process. In different embodiments, instead of controlling the motion of the heat source, the object being heated may be movable. The motion of the object can be controlled using a similar thermal-visual-servoing technique based on the computed temperature maps.

The methods and processes described in the detailed description section can be embodied as code and/or data, which can be stored in a computer-readable storage medium. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A heating system with thermal-visual-servo control, the system comprising:
    a heat source configured to emit heat to an object;
    a thermal camera configured to capture thermal images of the object; and
    a motion-control module coupled to the heat source and configured to control movement and focus of the heat source based on temperature information extracted from the thermal images, thereby facilitating controlled heating of the object.

2. The heating system of claim 1, wherein the heat source comprises one or more of:
    a heat gun;
    a blow dryer; and
    a heat lamp.

3. The heating system of claim 1, wherein the heat source is coupled to a motion module comprising one or more of:
    a gantry system;
    a robotic arm; and
    a ball-joint unit.

4. The heating system of claim 1, wherein the motion-control module is configured to implement a servo-control technique to control the movement of the heat source.

5. The heating system of claim 4, wherein the servo-control technique comprises one of: a reinforcement learning (RL)-based technique and a graph-based motion-planning technique.

6. The heating system of claim 1, further comprising a temperature-map-computing module configured to compute a time-varying temperature map to indicate temperature distribution on the object's surface at pixel level based on the thermal images.

7. The heating system of claim 1, further comprising a visible-light camera configured to capture visible-light images of the object and/or a depth camera configured to capture depth images of the object.

8. The heating system of claim 7, wherein the thermal camera and the visible-light and/or depth cameras are calibrated such that a pixel in a thermal image corresponds to a pixel in a visible-light image and/or a pixel in a depth image.

9. A method for facilitating thermal-visual-servo control while heating an object, the method comprising:
    applying localized heat to the object using a movable, directional heat source;
    capturing thermal images of the object while applying the heat; and
    controlling movement and focus of the movable, directional heat source based on temperature information extracted from the thermal images, thereby facilitating controlled heating of the object.

10. The method of claim 9, wherein the heat source comprises one or more of:
    a heat gun;
    a blow dryer; and
    a heat lamp.

11. The method of claim 9, wherein controlling movement of the heat source comprises moving the heat source via one or more of:
    a gantry system;
    a robotic arm; and
    a ball-joint unit.

12. The method of claim 9, wherein controlling the movement of the heat source comprises implementing a servo-control technique.

13. The method of claim 12, wherein the servo-control technique comprises one of: a reinforcement learning (RL)-based technique and a graph-based motion-planning technique.

14. The method of claim 9, further comprising:
computing a time-varying temperature map to indicate temperature distribution on the object's surface at pixel level based on the thermal images.

15. The method of claim 9, further comprising capturing visible-light images and/or depth images of the object.

16. The method of claim 15, further comprising calibrating a thermal camera capturing the thermal images and a visible-light camera capturing the visible-light images and/or a depth camera capturing the depth images such that a pixel in a thermal image corresponds to a pixel in a visible-light image and/or a pixel in a depth image.

17. A garment-drying station, the station comprising:
a working surface for supporting a to-be-dried garment piece;
a heat source configured to emit heat to the garment piece;
a thermal camera configured to capture thermal images of the garment piece; and
a motion-control module coupled to the heat source and configured to control movement and focus of the heat source based on temperature information extracted from the thermal images, thereby facilitating controlled heating of the garment piece.

18. The garment-drying station of claim 17,
wherein the heat source comprises one or more of: a heat gun, a blow dryer, and a heat lamp; and
wherein controlling movement of the heat source comprises moving the heat source via one or more of: a gantry system, a robotic arm, and a ball-joint unit.

19. The garment-drying station of claim 17, wherein the motion-control module is configured to implement a servo-control technique to control the movement of the heat source, and wherein the servo-control technique comprises one of: a reinforcement learning (RL)-based technique and a graph-based motion-planning technique.

20. The garment-drying station of claim 17, further comprising a temperature-map-computing module configured to compute a time-varying temperature map to indicate temperature distribution on the object's surface at pixel level based on the thermal images.

* * * * *